INVENTORS
DEAN R. HARRISON
WILLIAM J. KERWIN

ATTORNEYS

INVENTORS
DEAN R. HARRISON
WILLIAM J. KERWIN

BY

ATTORNEYS

United States Patent Office 3,545,275
Patented Dec. 8, 1970

3,545,275
TRANSDUCER CIRCUIT AND CATHETER TRANSDUCER
Dean R. Harrison and William J. Kerwin, Sunnyvale, Calif., assignors to the United States of America as represented by the Administrator of the National Aeronautics and and Space Administration
Filed Sept. 12, 1968, Ser. No. 759,460
Int. Cl. G01l 9/12
U.S. Cl. 73—398    8 Claims

ABSTRACT OF THE DISCLOSURE

This invention is an improved transducer circuit having a pair of impedance means each energized with a like carrier voltage of opposite polarity. At least one impedance means includes a variable impedance element adapted for external influence whereby a differential output voltage is produced proportional to such influence. The circuit requires only one coaxial cable for energization and return of output so as to be particularly directed to highly miniaturized devices, and the invention includes a catheter transducer incorporating this circuit.

DESCRIPTION

The invention described herein was made by employees of the U.S. Government and may be manufactured and used by or for the government for governmental purposes without the payment of any royalties thereon or therefor.

This invention relates to a transducer circuit and to a transducer for use in said circuit.

For many applications small-size transducers for pressure or temperature measurements are desired. For example, miniature diaphragm-type capacitance transducers mounted on the end of a cardiac catheter are used for measurement of introvascular pressures. In wind tunnel tests upon aircraft, space vehicles, missiles and the like, forces and moments acting upon a model of the device are measured by use of transducers. Such transducers should be of a minimum size to introduce a minimum disturbance of the air stream. Numerous other uses for miniature transducers will be apparent.

Prior-art transducers of the general type described above often require two coaxial cables, or a triaxial cable, for input and output connections thereto. Often, the sensitivity of the transducer is dependent upon the load resistance employed in the transducer circuit. They are often bulky and require numerous components at the sensing end.

An object of this invention is the provision of a transducer in which many of the problems encountered with prior-art transducers are avoided.

An object of this invention is the provision of a simple transducer circuit which requires the use of only a single coaxial cable for the input and output connections thereto.

An object of this invention is the provision of a transducer circuit of simple design which may be employed in a diaphragm-type capacitance transducer for measurement of pressure, or which circuit may be employed with a variable resistance element such as a thermistor for measurement of temperature.

An object of this invention is the provision of a transducer circuit which employs a carrier signal of a type which greatly improves the sensitivity of the transducer.

An object of this invention is the provision of a transducer circuit requiring a minimum of circuit components.

An object of this invention is the provision of a transducer and associated circuitry which provides an accurate output voltage for a static or dynamic change in capacitance or resistance over a wide temperature range using a minimum of components and cables in a minimum of space.

An object of this invention is the provision of a miniature transducer which may be constructed using integrated circuits.

The above and other objects and advantages of the invention are achieved by means of a transducer circuit comprising first and second impedance means, each of which includes a shunt-connected capacitor and resistor. Under normal conditions the first and second impedance means are of the same impedance. A carrier-signal source of balanced components of opposite polarity and having a zero average value is connected through a coupling capacitor and thence through first and second oppositely poled diodes to the first and second impedance means, respectively. At least one of the circuit components of the first or second impedance means is variable in response to a condition to be sensed for changing the impedance of one of said impedance means. If desired, dual variable resistors used differentially or a dual-electrode differential capacitor may be employed in the transducer. The summation of the rectified voltages across the first and second impedance means appears at the carrier input to the diodes as a result of the ungrounded coupling capacitor, and integrating means such as a series-connected resistor and shunt capacitor are connected to the carrier-input circuit to the diodes to provide an output responsive to the average value thereat, which, in turn, is dependent upon the unbalance of the first and second impedance means. One of the impedance means and a diode may be mounted adjacent one end of a coaxial cable which serves as a catheter, or the like. The carrier voltage source and ungrounded coupling capacitor and other diode and impedance means may be connected to the other end of the coaxial cable. With this arrangement, a single coaxial cable serves for the transmission of the reference signal to the one impedance means and for the transmission of an output signal therefrom to provide a very small diameter catheter, or the like.

The invention will be better understood from the following description when read in conjunction with the accompanying drawings. In the drawings wherein like reference characters refer to the same parts in the several views.

Figure 1:
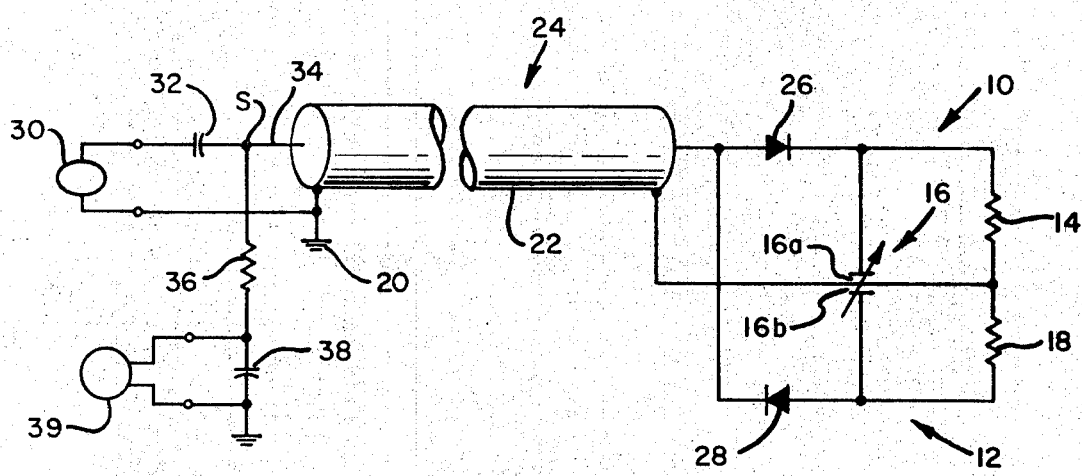
FIG. 1 is a schematic circuit diagram of a novel transducer circuit embodying this invention and which employs a differential transducer element.

Reference is first made to FIG. 1 wherein the novel transducer circuit of this invention is shown comprising first and second impedance means 10 and 12. The one impedance means 10 comprises a resistor 14 in shunt connection with one-half 16a of a differential capacitor 16, and the other impedance means 12 comprises a resistor 18 in shunt connection with the other half 16b of the differential capacitor. One end of the impedance means 10 is connected to one end of the impedance means 12 and together they are connected to a common ground terminal 20 through the outer tubular conductor 22 of a coaxial cable 24. The other ends of the impedance means 10 and 12 are connected to oppositely poled rectifying diodes 26 and 28, respectively, and an alternating-current carrier signal source 30 is connected to said diodes through an ungrounded coupling capacitor 32 and the center conductor 34 of the coaxial cable 24. The carrier signal source may comprise a source of square waves, sine waves, pulses or the like. Regardless of the particular shape of waveform employed, the carrier signal at the output from the coupling capacitor (at the point designated S in the drawing) comprises a waveform having balanced opposite polarity components and an average value of zero when 34 is disconnected. The impedance means 10 and 12 are initially balanced, i.e., the capacitance and resistance of each are equal to those of the other.

Figure 2:
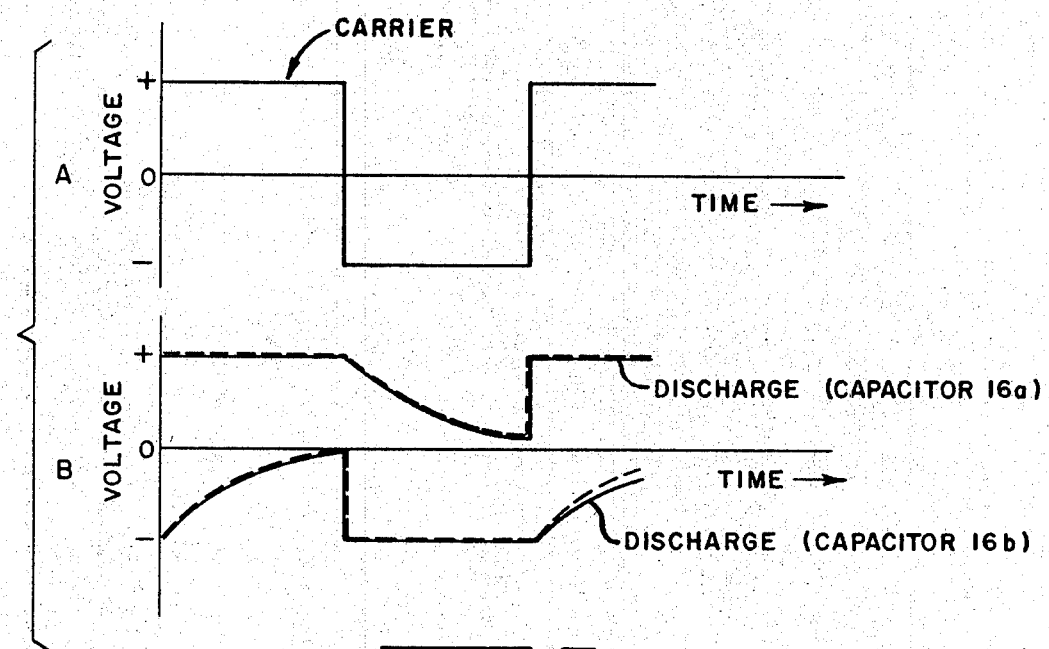
FIGS. 2, 3 and 4 show square, sine and pulse carrier-waveforms, respectively, with corresponding waveforms which result at the transducer impedance means.
Figure 3:
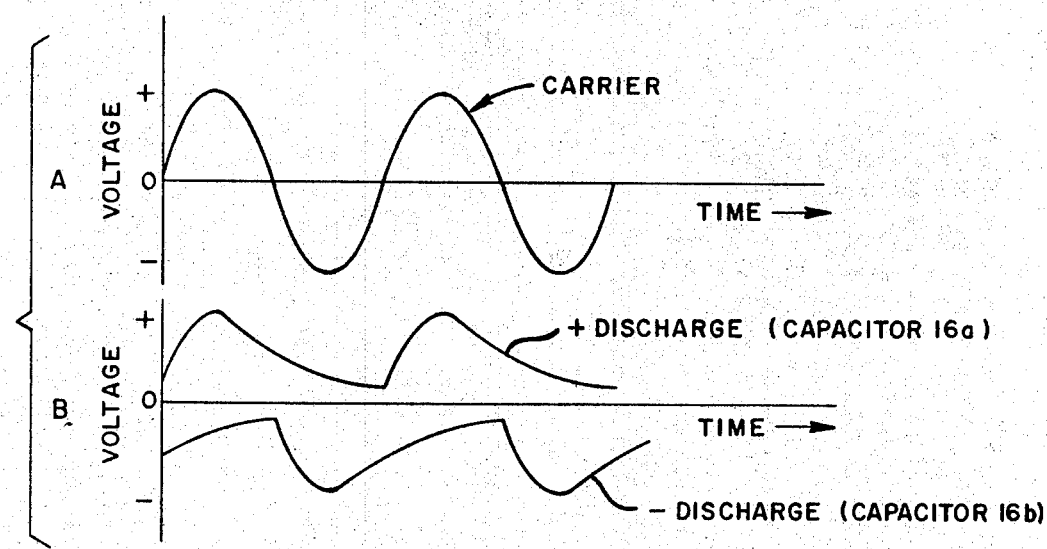
Figure 4:
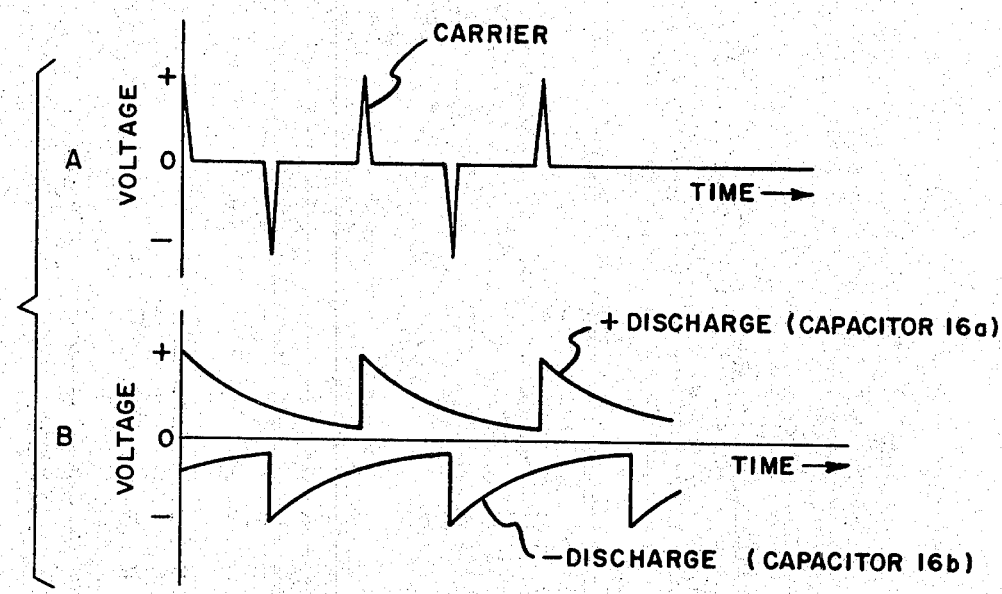

In FIGS. 2, 3 and 4 of the drawings carrier signals of different-shape waveforms are shown, together with the resultant waveforms appearing across the impedance means 10 and 12. A square-wave carrier is shown in FIG. 2 at part A, and the positive and negative waveforms across the impedance means 10 and 12 are shown at part B. It will be seen that for one-half cycle of the carrier wave the impedance means 10 is subjected to the full positive half cycle of the carrier. During the next half cycle, the capacitor section 16a discharges through the resistor 14. The capacitor section 16b is charged and discharged through the resistor 18 on opposite half cycles, as shown. As mentioned above, the average value of the carrier signal is zero at point S. If the impedances 10 and 12 are equal, then the average value of the sum of the potentials across the impedances 10 and 12 also is zero, as shown in solid lines in FIG. 2, part B. If, however, the impedance means 10 and 12 are unbalanced (as, for example, by reasons of a differential change of the value of capacitor 16) then the average value of the voltages across the impedance means 10 and 12 also will be unbalanced. In part B of the waveforms of FIG. 2, the broken-line waveforms illustrate the condition wherein capacitor 16a increases in value and 16b decreases in value. It will be apparent that the average value of the two waveforms shown in broken line now is of a positive value. However, the sense of the change in the output voltage at point S will be negative, that is, an increasing change in capacitance of $C_{16a}$ will cause the output voltage to go negative. This is a result of the point S being essentially ungrounded and the coupling capacitor being in series with the charging diode. Thus, when electronic charge is supplied to the impedance means through the diode, the coupling capacitor must become charged in the opposite sense. It then follows that the charging action of the second reverse-poled diode restores charge to the capacitor thus returning the voltage at point S to an average value determined by the degree of balance between the two impedance means.

An integrating or filter means comprising a series-connected resistor 36 and output capacitor 38 is connected between the point S and the common ground terminal 20, and a direct-current output potential $E_0$ is developed across the capacitor 38 which is dependent upon the differential capacitance of capacitor 16. Measuring or indicating means 39 are connected across output terminals of the circuit on each side of the capacitor 38.

The output voltage of the circuit to a pulsed waveform input is expressed as follows:

$$E_0 = \frac{E_m R}{T} (C_{16a} - C_{16b} + C_{16b} e^{-T/RC_{16b}} - C_{16a} e^{-T/RC_{16a}}) \quad (1)$$

where:

$E_m$ = the maximum amplitude of the carrier voltage
$R = R_{14} = R_{18}$ (the resistance of resistors 14 and 18, respectively)
$C_{16a}$ = the capacitance of capacitor 16a
$C_{16b}$ = the capacitance of capacitor 16b
$T$ = the period of the carrier signal The system sensitivity, S, which is a fractional change in the output voltage, $\Delta E/E_m$, for a corresponding change in the fractional capacitance, $\Delta C/C$, can be shown to be:

$$S = \frac{\Delta E/E_m}{\Delta C/C} = \frac{RC}{T} \left( 1 - e^{-T/RC} - \frac{T}{RC} e^{-T/RC} \right) \quad (2)$$

where:

$C = C_{16a} = C_{16b}$ (the capacitance of capacitors 16a and 16b at balance)

Figure 5:
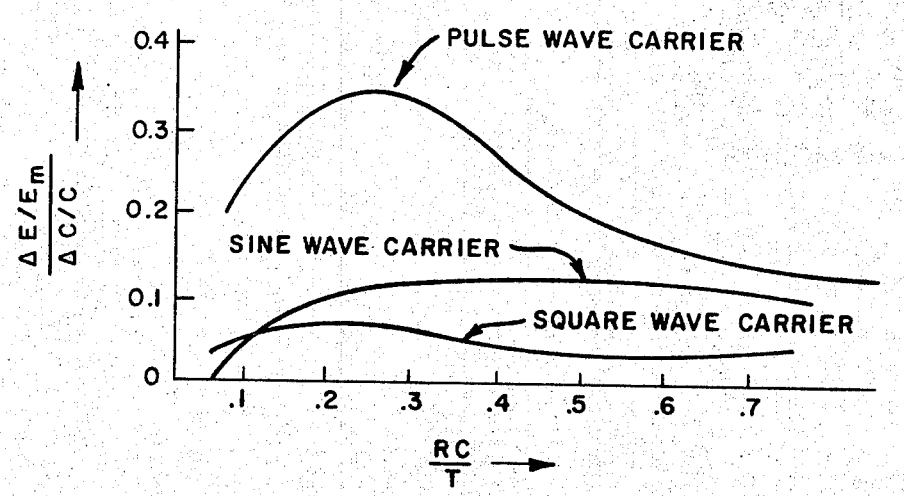
FIG. 5 is a graph showing the sensitivity of the transducer circuit as a function of $RC/T$ for a square-wave, sine-wave, pulse-waveform carrier.

For the square-wave carrier shown in FIG. 2, the capacitor sections 16a and 16b discharge through the associated resistors 14 and 18, respectively, during one-half of the square-wave period T. By use of a sinewave carrier the period during which the capacitor sections 16a and 16b discharge may be increased, as shown in FIG. 3. There, the capacitor sections 16a and 16b are shown discharging for approximately three-fourths of the period of the sinewave carrier. Further increase in the length of time during which discharge of capacitor sections 16a and 16b is possible is obtained by use of a pulse waveform such as illustrated in FIG. 4. With such a carrier, the capacitor sections are charged substantially instantaneously and discharge during the remainder of the period which is substantially the entire period. Greatest circuit sensitivity is obtained by use of the pulse waveform carrier. A plot of the measured sensitivity of the circuit as a function of $RC/T$ for square-wave, sine-wave and pulse waveform carriers is shown in FIG. 5.

Various changes and modifications in the circuitry are possible, as will be apparent to those skilled in the art. For example, instead of employing a differential capacitor 16, a reference capacitor and capacitor transducer may be employed. Further, a pair of fixed capacitors may be employed instead of the elements 16a and 16b, together with a dual strain gage resistor used differentially in place of the resistor 14 and 18. Alternatively, one resistor may comprise a fixed resistor and the other a strain gage resistor, temperature-sensitive resistor, or the like. An equation for output voltage expressed in terms of resistances 14 and 18 is as follows:

$$E_0 = \frac{E_m C}{T} (R_{14} - R_{18} + R_{18} e^{-T/R_{18}C} - R_{14} e^{-T/R_{14}C}) \quad (3)$$

and the fractional sensitivity is:

$$S = \frac{\Delta E/E_m}{\Delta R/R} = \frac{RC}{T} \left( 1 + e^{-T/RC} \frac{T}{RC} e^{-T/RC} \right) \quad (4)$$

wherein:

$R_{14}$ = the resistance of resistor 14
$R_{18}$ = the resistance of resistor 18, and
$R = R_{14} = R_{18}$ = the initial resistance of resistors 14 and 18 at balance.

With the variable resistance arrangement, the output is zero when the resistors are balanced, and for a change in either resistors or a differential change between resistors (i.e., one resistor increases while the other decreases in value), an output is obtained.

Figure 6:
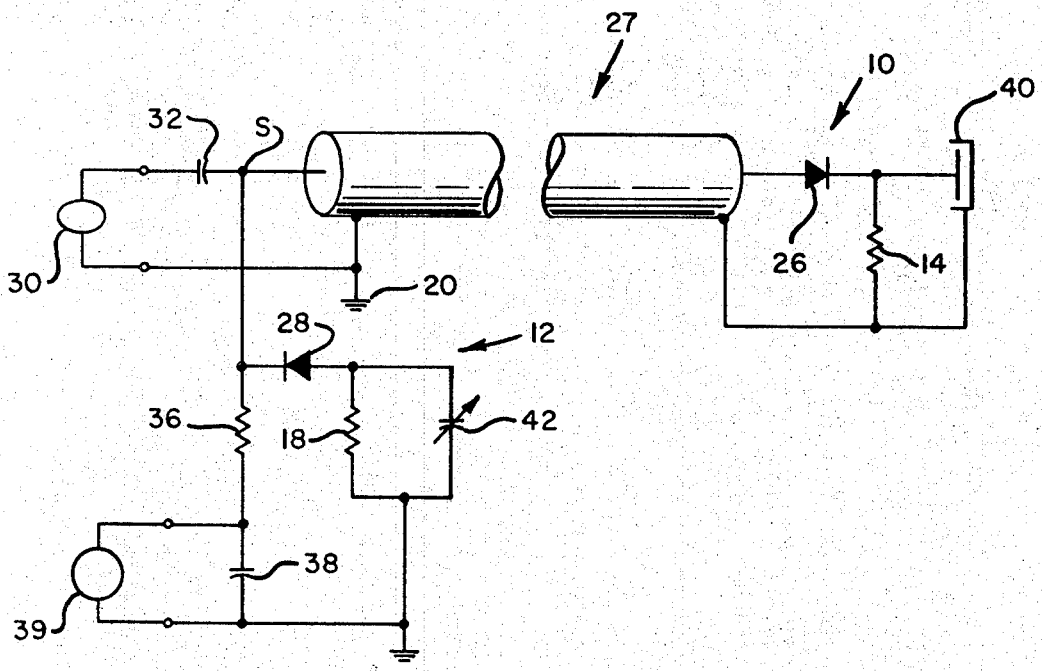
FIG. 6 is a schematic circuit diagram which is similar to that of FIG. 1 but showing the use of a single transducer element at one end of a coaxial cable.

With the novel circuit arrangement of this invention, the impedance means 10 and 12 also may be located at opposite ends of the coaxial cable 24. Such an arrangement is shown in FIG. 6 to which figure reference now is made. Instead of the differential capacitor 16 shown in FIG. 1, the arrangement of FIG. 6 includes a capacitance transducer 40, or diaphragm capacitor, in the impedance means 10 which is located at the inner end of the coaxial cable 24, and a variable capacitance 42 in the impedance means 12 which is located at the outer end of the coaxial cable. The remainder of the circuit elements are the same as shown in FIG. 1 and are provided with the same reference characters. Furthermore, the operation is the same as that of the FIG. 1 arrangement described above, with the exception that only the value of the capacitor 40 varies during use. The reference capacitance 42 is initially adjusted for circuit balance and remains fixed during operation. With the arrangement of FIG. 6, fewer circuit components are required at the inner end of the coaxial cable, whereby the arrangement is readily adapted for miniaturization. Inasmuch as the circuit of the present invention is highly sensitive, it is important to consider the environmental affect upon circuit components. The circuit of FIG. 1 locates the elements of the impedance means together, so like effects on all components are to be expected, but, in the circuit of FIG. 6, provision should be made to expose the separated portions of the circuitry to the same temperature environments.

Figure 7:
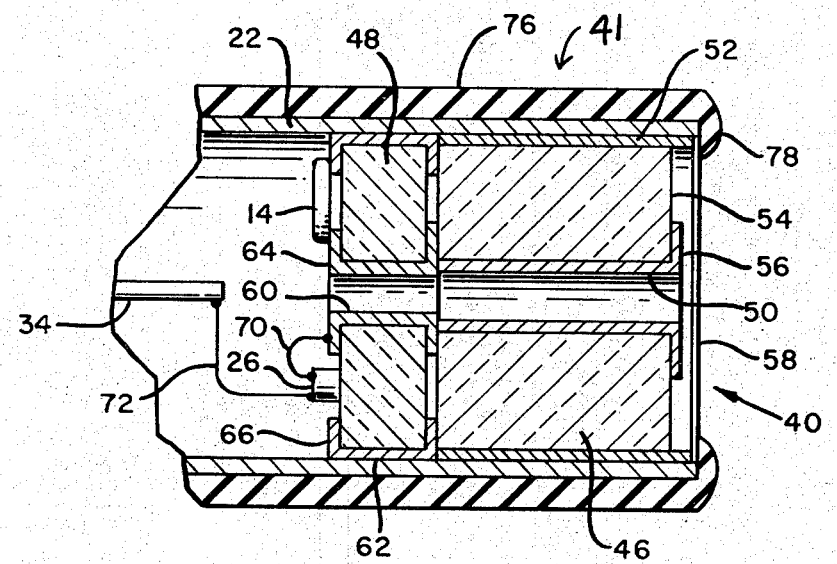
FIG. 7 is a longitudinal cross-sectional view of a novel miniature diaphragm-type capacitance transducer employing the transducer circuit of this invention.

Reference is now made to FIG. 7 wherein there is shown a miniature diaphragm-type capacitance suitable for use as a catheter as comprising an outer conductor 22 formed of a flexible metal braid, or the like, and a flexible coaxial inner conductor 34. At the outer end of the conductors the space between the conductors contains an insulating material, such as Teflon, which is loosely fitted to allow air to traverse through the cabling. In this manner the material provides insulation between conductors 22 and 34 and allows air passage to the capacitor 40.

The outer conductor 22 may extend outwardly beyond the end of the inner conductor 34 to form a housing 41 about the impedance 10. As shown, first and second adjacent annular-shaped insulating members 46 and 48 are mounted inside the outer conductor. The insulating member 46 is provided with a central conduction tube 50 and an outer metallic cylindrical electrode 52 having a forward end which extends slightly outwardly beyond the forward face 54 of the insulating member. The forward face 54 of the insulating member 46 is provided with a conductive metallic electrode 56 which engages the end of the inner tube 50 but which is out of electrical engagement with the electrode 52. The electrode 56 may comprise a film of platinum fired onto the insulating member 46 of glass or other suitable insulating material. The electrode 56 comprises the fixed, or stationary, electrode of the capacitor 40.

The movable electrode of the capacitor 40 comprises a pressure-responsive diaphragm 58 formed of any suitable conducting material such as forty-two-percent-nickel steel. The rim of the diaphragm is secured, as by welding, to the forward edge of the electrode 52, which, as noted above, slightly projects beyond the face of the electrode 56. An air space is formed between the fixed electrode 56 and the movable diaphragm electrode 58 which constitutes the dielectric of the transducer capacitor 40.

The second insulating body 48 is provided with tubular inner and outer electrodes 60 and 62 having outwardly and inwardly directed flanges 64 and 66, respectively, formed at opposite ends of each. The electrode flanges 64 and 66 are in electrical engagement with the central conductive tube 50 and outer electrode 52, respectively, of the insulator 46, and may be secured thereto, as by soldering, to provide electrical contact therebetween. The resistor 14 and diode 26 are secured to the insulating member 48. Preferably the insulating member 48 comprises a ceramic base upon which the resistor 14 and diode 26 are mounted or integrally formed. In the illustrated arrangement the resistor and diode are shown formed on individual dice attached to the ceramic base 48.

The resistor terminals are connected to the electrodes 60 and 62 for shunt connection of the resistor 14 with the capacitor 40 through the conductor 50 and electrode 52, respectively. The cathode electrode of the diode 26 is connected to a resistor terminal through a wire 70 while the diode anode is connected to the center conductor 34 of the coaxial cable 24 by wire 72. The outer electrode 22 of the coaxial cable surrounds the tubular insulating members 46 and 48 and is in electrical engagement with the electrodes 52 and 62, respectively, thereon.

The catheter is housed in a fluid-impervious, flexible tube 76 of insulating material, which, preferably, comprises a tube of heat-shrinkable plastic which is placed over the outer conductor 22 in an expanded condition and then is permitted to shrink to urge the outer conductor into tight engagement with the annular insulating members 46 and 48 through the electrodes 52 and 62, respectively. An inwardly directed end, or flange, 78, at the inner end of the tubular cover 76 engages the diaphragm 58 in sealing-tight engagement therewith. The opposite end of the coaxial cable may be provided with a conventional connector not shown. The remainder of the electrical circuit to which the capacitor 40, resistor 14 and diode 26 are connected (through the coaxial cable) is shown in FIG. 6 and is not repeated in FIG. 7.

The housing 41 may be left open to atmospheric pressure or may be coupled to a fluid-pressure source, as desired. A fluid passage is provided through the cable and through the apertured insulating members 46 and 48 to the inner face of the movable electrode 58, whereby atmospheric pressure, or a desired reference pressure, may be provided at the capacitance 40 of the transducer.

Figure 8:
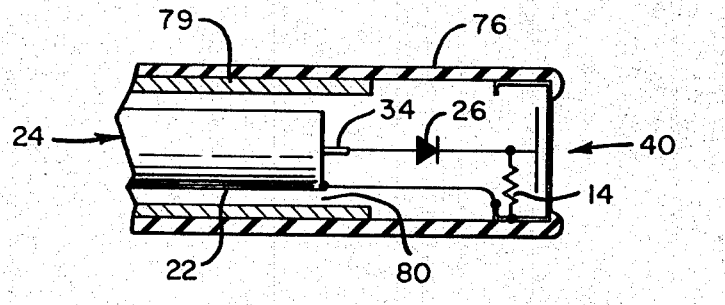
FIG. 8 is a partially schematic illustration in section of a transducer device such as that of FIG. 7, but further illustrating circuitry and fluid-passage construction.

The embodiment of the present invention described immediately above and illustrated in FIG. 7 produces an output signal in response to pressure differences across diaphragm 58 which changes the capacitance of transducer capacitor 40. Thus it is important to provide a reference pressure within the housing 41, and this is accomplished by connection through, or along, the cable 24. The connection may be to atmosphere for venting the housing or to some reference pressure source, but, in use, the housing is often located in places where direct venting, for example, is not possible. One arrangement for venting, or otherwise establishing the interior housing pressure, is schematically shown in FIG. 8 which also illustrates the electrical circuit physically embodied in FIG. 7. Referring to FIG. 8, there is shown the coaxial cable 24 with the diode 26 coupling the center conductor thereof to one side of the capacitor 40. The other side of the capacitor 40 is directly connected to the cable sheath 22 and the resistor 14 connected across the capacitor. Upon comparison, it will be seen that this electrical circuitry is provided by the structure of FIG. 7.

There is additionally illustrated in FIG. 8 a flexible and yet noncollapsible tubular conduit 79 about the coaxial cable 24. The inside diameter of the conduit 79 is greater than the outside diameter of the cable 24 to thus provide an air passage 80 longitudinally of the cable. This then provides a manner of remotely establishing the pressure on the inside of the capacitance diaphragm 58 from the other end of the cable. The exterior sealing tube 76 fits about the conduit 79, and, as noted above, the tube 76 may be shrunk, as by heat, to tightly fit the conduit. The conduit may, for example, be formed of Teflon, or the like, and should be capable of gradual curvature but not subject to pinching or collapse. Of course, the cable 24 need not remain centered in the conduit, for the passage 80 exists as long as the conduit does not collapse. Other manners of providing a passage from the input end of the cable to the capacitor 40 are also possible.

With this invention, the coaxial cable and associated capacitance-type transducer may be constructed of very small size, and thereby is readily adapted for capacitance pressure measurement in biological-heart catheter and telemeter implant applications and for wind tunnel, aircraft and spacecraft applications. Only a single coaxial cable for both input and output connections is required rather than two coaxial cables or a triaxial cable. Fewer component parts are required at the pressure-sensing end of device. True miniaturization is herein achieved; for one practical device constructed employed a coaxial cable with an outside diameter of 0.008 inch and the total catheter diameter of the order of 0.04 inch. The operation of the circuit and sensitivity thereof is independent of the load resistance, and the use of a pulse waveform greatly enhances the sensitivity of the device. The circuit output is single-ended and does not require the use of a differential amplifier and its associated problems. Although the coaxial cable may be terminated in its characteristic impedance to completely remove the effect of the cable length or cable capacity, the sensitivity of output to change in transducer capacity is reduced if this is done.

Having described our invention, we claim:

1. A pressure-responsive device comprising,
   an elongated flexible outer tubular conductor member,
   a capacitor comprising fixed and movable electrodes, said movable electrode comprising a movable diaphragm at one end of said outer tubular conducting member in conductive engagement therewith, said fixed electrode being positioned inside the tubular conducting member a spaced distance from said movable electrode and out of electrical engagement with said outer tubular member,
   a circuit inside said tubular conductor member including a diode and a resistor,
   means connecting said resistor between said electrodes of said capacitor,
   a center elongated electrical conductor inside said outer tubular conductor extending coaxially therewith,
   said center conductor having an end spaced from said fixed electrode, and
   said diode being connected between said center conductor end and said fixed electrode.

2. The pressure-responsive device as defined in claim 1 including an outer non-conductive tubular cover surrounding the outer tubular member, and
   means for conveying fluid through the tubular cover to and from the face of said diaphragm opposite said fixed capacitor electrode.

3. The pressure-responsive device as defined in claim 1 including a first annular insulating member inside said tubular conductor member upon which said fixed electrode is formed, and
   a second annular insulating member inside said tubular conductor member upon which said diode and resistor are mounted.

4. A catheter transducer comprising,
   a tubular housing having an open end,
   a capacitor within said housing and having a fixed electrode and a movable diaphragm electrode closing the open end of said housing,
   a single coaxial cable extending from said housing with the conductors thereof electrically connected across said capacitor,
   a first diode and a resistor disposed in said housing with said resistor connected across said capacitor and said diode coupling a first cable conductor to one side of said capacitor,
   an impedance circuit including a parallel connected resistor and capacitor combination connected across the cable conductors at the opposite end of said cable from said housing,
   a second diode disposed in the connection of said combination to said cable between the combination and said first cable conductor and poled oppositely to said first diode,
   input terminals capacitively coupled to said cable conductors at the end opposite said housing and adapted for energization with a balanced alternating-current voltage, and
   output terminals coupled across said cable conductors at the end opposite said housing and adapted to be connected to voltage-indicating means.

5. Impedance measuring apparatus comprising
   first and second impedances, said impedances having values of the same order of magnitude and at least one of said impedances being variable,
   a carrier signal source generating a carrier signal with balanced opposite polarity components,
   said carrier signal having first and second terminals,
   a capacitor having first and second electrodes,
   said first capacitor electrode being connected to said first terminal of said carrier signal source,
   a first rectifier connected in series with said first impedance between said second capacitor electrode and said second terminal of said carrier signal source,
   a second rectifier connected in series with said second impedance between said second capacitor electrode and said second terminal of said carrier signal source,
   said first rectifier and said first impedance producing a first rectified and filtered signal, said second rectifier and said second impedance producing a second rectified and filtered signal, said first and second rectified and filtered signals being of opposite polarity,
   said rectifiers and impedances causing the D-C voltage on said capacitor to be a function of the unbalance of said first and second impedances and a function of the difference between the values of said first and second rectified and filtered signals, and
   D-C voltage measuring means coupled to said capacitor for measuring the D-C voltage thereon, said measuring means having filtering means for rejecting said carrier signal.

6. Impedance measuring apparatus as claimed in claim 5 wherein said first impedance is a variable impedance and a coaxial cable is used to connect said first rectifier and said first impedance to said second capacitor electrode and said second terminal of said carrier signal source.

7. Impedance measuring apparatus as claimed in claim 5 wherein said first and second impedances each comprise a resistor and capacitor in shunt, and a coaxial cable is used to connect both rectifiers and both impedances to said second capacitor electrode and said second terminal of said carrier signal source.

8. Impedance measuring apparatus as claimed in claim 5 wherein the carrier signal source generates a pulse waveform and the pulse width is much less than the pulse period.

References Cited

UNITED STATES PATENTS

| 2,508,478 | 5/1950 | Uehling | 73—362 |
| 2,676,489 | 4/1954 | Basham | 73—342 |
| 2,929,020 | 3/1960 | Mayes | 73—398X |

DONALD O. WOODIEL, Primary Examiner

U.S. Cl. X.R.

324—61